(12) United States Patent
Choi

(10) Patent No.: US 10,512,311 B2
(45) Date of Patent: Dec. 24, 2019

(54) ORNAMENT ASSEMBLY

(71) Applicants:Hun Sik Choi, Gyeonggi-Do (KR); KI METAL CO., LTD., Gyeonggi-do (KR)

(72) Inventor: Hun Sik Choi, Gyeonggi-do (KR)

(73) Assignees: Hun Sik Choi, Gyeonggi-Do (KR); KI METAL CO., LTD., Gyeonggi-Do (KR)

( * ) Notice: Subject to any disclaimer, the term of this patent is extended or adjusted under 35 U.S.C. 154(b) by 14 days.

(21) Appl. No.: 15/864,325

(22) Filed: Jan. 8, 2018

(65) Prior Publication Data
US 2018/0125174 A1 May 10, 2018

Related U.S. Application Data

(63) Continuation of application No. 14/425,577, filed as application No. PCT/KR2014/013111 on Dec. 31, 2014, now Pat. No. 9,894,963.

(30) Foreign Application Priority Data

Aug. 18, 2014 (KR) ......................... 10-2014-0107284
Oct. 31, 2014 (KR) ......................... 10-2014-0150510

(51) Int. Cl.
*A44B 13/00* (2006.01)
*A45C 13/30* (2006.01)
*A45C 13/08* (2006.01)

(52) U.S. Cl.
CPC .......... *A44B 13/0088* (2013.01); *A45C 13/08* (2013.01); *A45C 13/30* (2013.01)

(58) Field of Classification Search
CPC ..... A44B 13/0088; A44B 13/08; A44B 13/30; A44B 13/007; Y10T 16/05;
(Continued)

(56) References Cited

U.S. PATENT DOCUMENTS 2,062,057 A * 11/1936 Hobby ................. B60R 13/105
24/107
3,091,795 A * 6/1963 Budwig ................. F16L 5/027
16/2.1
(Continued)

FOREIGN PATENT DOCUMENTS

EP 1279569 A1 1/2003

OTHER PUBLICATIONS

European Search Report for EP14900101.8 dated Jan. 8, 2018 from European patent office in a counterpart European patent application.

*Primary Examiner* — Victor D Batson
*Assistant Examiner* — Matthew J Sullivan
(74) *Attorney, Agent, or Firm* — The PL Law Group, PLLC

(57) ABSTRACT

An ornament assembly forms a ring hole for a string or a latch through fabric or leather goods. The ornament assembly includes a first body and a second body. The first body includes a first base defining a first through hole at a center of the first base and a first protrusion protruded from a boundary of the first through hole. The second body includes a second base defining a second through hole at a center of the second base and a second protrusion protruded from a boundary of the second through hole. The first protrusion defines an insert groove at a surface which is opposite to the second protrusion. The second protrusion is configured to be inserted into the insert groove to be combined with the first protrusion.

12 Claims, 10 Drawing Sheets

(58) Field of Classification Search
CPC ........... Y10T 29/49876; Y10T 24/3742; F16B 21/06; B60R 16/0222; A43B 13/08
See application file for complete search history.

(56) References Cited

U.S. PATENT DOCUMENTS

| | | | | |
|---|---|---|---|---|
| 3,210,820 | A * | 10/1965 | Humiston | A44B 17/0029 24/578.12 |
| 4,376,605 | A * | 3/1983 | Thomsen | H05K 7/12 174/138 D |
| 4,621,961 | A * | 11/1986 | Gulistan | F16B 41/002 411/352 |
| 4,702,443 | A * | 10/1987 | Callaway | F16L 3/00 24/132 AA |
| 5,031,268 | A * | 7/1991 | McCabe | F16B 21/088 16/2.1 |
| 5,295,652 | A * | 3/1994 | Byrne | B60G 21/0551 16/2.1 |
| 5,573,825 | A * | 11/1996 | Brewster | G09F 7/00 283/75 |
| 6,076,240 | A * | 6/2000 | Henzler | A44B 17/0011 24/661 |
| 7,370,878 | B2 * | 5/2008 | Nakazawa | B60R 21/213 16/2.1 |
| 9,521,889 | B2 * | 12/2016 | Fathollahi | A45C 13/002 |
| 10,124,742 | B2 * | 11/2018 | Martinez | F16B 21/02 |

* cited by examiner

ORNAMENT ASSEMBLY

CROSS REFERENCE TO RELATED APPLICATIONS

The present application is a continuation of U.S. patent application Ser. No. 14/425,577, filed Mar. 3, 2015, which is a National Phase application under 35 U.S.C. § 371 of International Application No. PCT/KR2014/013111, with an International Filing Date of Dec. 31, 2014, which claims the benefit of Korean Patent Applications No. 10-2014-0107284, filed on Aug. 18, 2014 and Korean Patent Applications No. 10-2014-0150510, filed on Oct. 31, 2014 at the Korean Intellectual Property Office, the disclosures of which are incorporated by reference herein in their entirety.

BACKGROUND

Field of the Disclosure

Example embodiments of the disclosure relate to an ornament assembly. More particularly, example embodiments of the disclosure relate to an ornament assembly, which is an ornament itself, to form a ring hole for a string or a latch through fabric or leather goods.

Related Art

A bag is a fashion item with a cloth, as well as an item for receiving stuffs in daily life.

Especially, a women's handbag is sensitive to fashion, so that changes of design are needed according to changes of fashion such as various ages, jobs, clothing, seasons, places and trip purposes.

An example of these latest designs, a case that shoulder straps of bag or handbag are provided by metal chains, has been recently increased. However, material for the bag or handbag is usually soft material such as fabric or leather which is thin and easy to be damaged on a surface thereof, so that there is a problem with damages on a connecting portion of the metal chains and the fabric or leather due to friction.

Therefore, a connecting ring may be attached where the metal chain is connected, so that wearing of the fabric of the bag or handbag may be prevented. This connecting ring may be an ornament itself due to its color and shapes.

A traditional connecting ring has a first body at a side of the bag or handbag, and a second body which is disposed at an opposite side of the bag or handbag and combined with the first body.

However, combination type of the traditional connecting ring to fix the first and second bodies may be a screw combination of the first and second bodies, or a riveting combination which is bending a protrusion of the first or second bodies after combining the first body to the second body.

However, the traditional connecting ring according to the screw combination type has a problem with decrease of combining force due to a relative rotation of the first and second bodies.

In addition, the traditional connecting ring according to the riveting combination type has a problem with poor workability, poor design, and durability. In relation to poor workability, the traditional connecting ring may need a press process. In relation to poor design, the protrusion may be shown by user. In relation to poor durability, the fabric between the first and second bodies may be damaged by the relative rotation of the first and second bodies.

SUMMARY

The purpose of the disclosure is providing an ornament assembly which is capable of improving workability and coupling function to solve the above-mentioned problems.

Another purpose of the disclosure is providing an ornament assembly to prevent disassemble of the ornament assembly in use, by preventing from relative rotation of a first body and a second body.

Another purpose of the disclosure is providing an ornament assembly. The ornament assembly which is an ornament itself, may reinforce the strength of a connecting ring which connects a string to bag, handbag, banner, tent and the like, so that a damage due to wear and tear may be prevented.

According to an example embodiment of the disclosure, an ornament assembly includes a first body and a second body. The first body includes a first base defining a first through hole at a center of the first base and a first protrusion protruded from a boundary of the first through hole. The second body includes a second base defining a second through hole at a center of the second base and a second protrusion protruded from a boundary of the second through hole. The first protrusion defines an insert groove at a surface which is opposite to the second protrusion. The second protrusion is configured to be inserted into the insert groove to be combined with the first protrusion.

In an example embodiment, the first body may further include an incision portion which is formed at a side of the first protrusion. The incision portion may be connected to the insert groove.

In an example embodiment, the second body may include a locking portion which is protruded from an end portion of the second protrusion toward outside. The locking portion may be inserted in the insert groove and supported by a side of the incision portion.

In an example embodiment, an inner sidewall of the insert groove of the first protrusion may be inclined, so that the locking portion of the second body may be guided to the incision portion of the first body.

In an example embodiment, the incline angle of the inner sidewall of the insert groove may be 7 degree to 10 degree with respect to a central axis.

In an example embodiment, the second protrusion may be divided into a plurality of parts along the boundary of the second through hole. The insert groove of the first protrusion may be divided into plurality of parts.

In an example embodiment, the first body may further include a dividing rib formed between the insert grooves disposed adjacent to each other.

In an example embodiment, outer side-surface of the second protrusion of the second body may be inclined, so that outer diameter of the second protrusion may be gradually decreased as going to an end thereof.

In an example embodiment, an outer side-surface of the second protrusion of the second body may be inclined, so that outer diameter of the second protrusion may be gradually decreased as going to a lower portion of the locking portion.

In an example embodiment, the first body may further include a locking jaw which is formed at a side of the insert groove of the first protrusion. The second body may further include a locking portion which is protruded at an end portion of the second protrusion toward outside. The locking portion may be inserted in the insert groove and is stuck and supported by the locking jaw.

In an example embodiment, the second body may further include a single stepped portion at an inner side of the second protrusion.

According to the ornament assembly of the disclosure, the second protrusion of the second body is inserted in the first protrusion of the first body, so that the end portion of the second protrusion is not shown to users. Thus, a design of the ornament assembly may be improved.

In addition, according to the ornament assembly of the disclosure, relative rotation of the first and second bodies after the combination of the first and second bodies may be prevented. Thus, problem with separation during the use of the ornament assembly and problem with damage on the fabric may be prevented.

In addition, according to the ornament assembly of the disclosure, the first body and the second body may be combined together by simply pressing them, so that workability may be improved.

DETAILED DESCRIPTION

Figure 1:
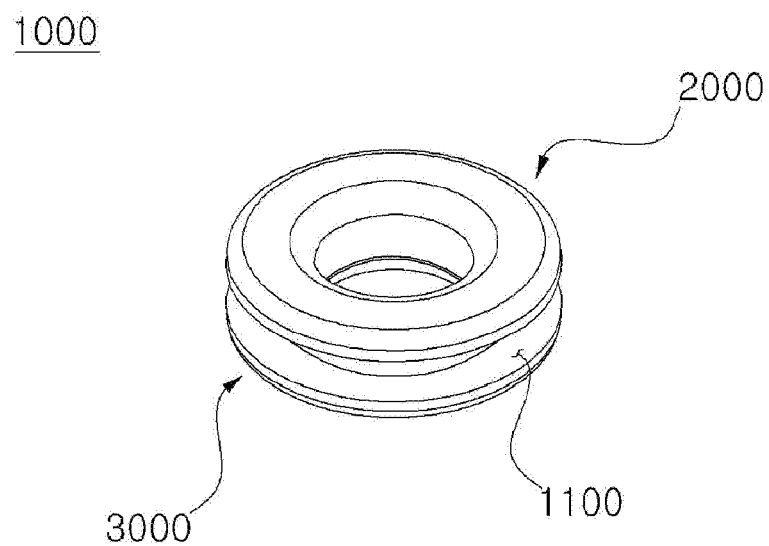
FIG. 1 is a combined perspective view illustrating an ornament assembly according to an example embodiment of the disclosure.

Hereinafter, the disclosure is described more fully hereinafter with reference to the accompanying drawings, in which example embodiments of the disclosure are shown. The disclosure may, however, be embodied in many different forms and should not be construed as limited to the example embodiments set forth herein. Rather, these example embodiments are provided so that this disclosure will be thorough and complete, and will fully convey the scope of the disclosure to those skilled in the art. Like reference numerals refer to like elements throughout the accompanying drawings.

FIG. 1 is a combined perspective view illustrating an ornament assembly according to an example embodiment of the disclosure.

According to the example embodiment of the disclosure, an ornament assembly 1000 is combined with a fabric 1 such as cloth, leather or synthetic resin and works as a connecting ring, so that a string (not shown) may be attached to the fabric through the ornament assembly 1000. The ornament assembly 1000 includes a first body 2000 which is disposed at a surface of the fabric 1, and a second body 3000 which is disposed an opposite surface of the fabric 1 and combined with the first body 2000.

At this time, shapes of the first body 2000 and the second body 3000 may be various as needed such as circular, elliptical or polygonal shapes. According to an example embodiment of the disclosure of FIG. 1, the first and second bodies 2000, 3000 have ring shapes, and are combined with each other in a vertical direction. When the first body 2000 is combined with the second body 3000, a gap 1100 is formed along outer peripheral surfaces of the first body 2000 and the second body 3000, so that the fabric 1 may be disposed in the gap 1100.

The first body 2000 and the second body 3000 may include a various material having elasticity such as a plastic, metal and etc., as considering the fabric 1 and material of a string which is connected to the fabric 1.

Figure 2:
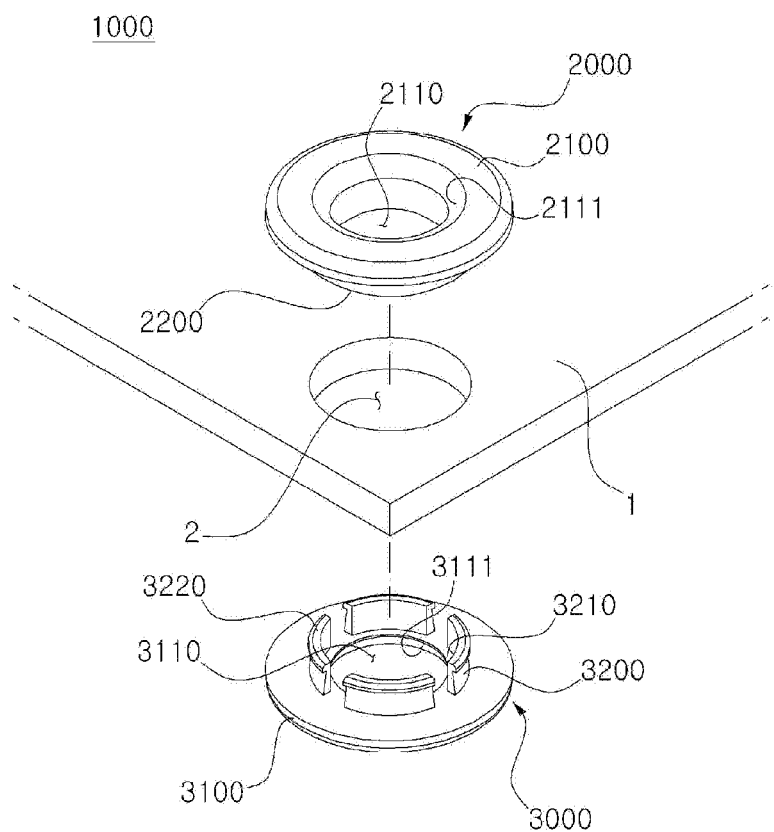
FIGS. 2 and 3 are exploded perspective views illustrating an ornament assembly according to an example embodiment of the disclosure.
Figure 3:
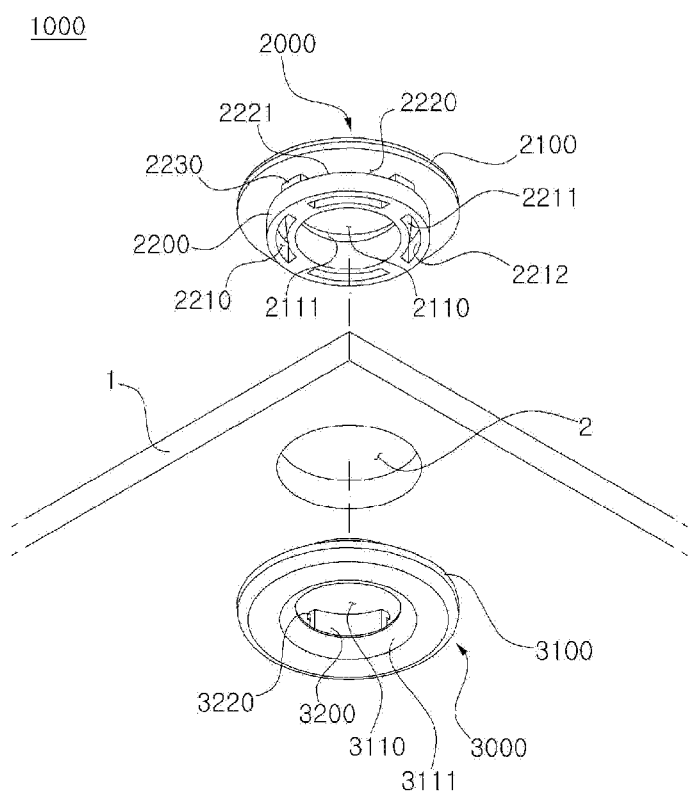
Figure 4:
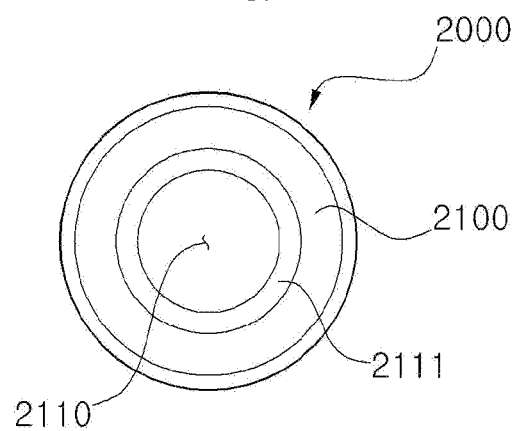
FIG. 4 is a plan view illustrating a first body according to an example embodiment of the disclosure.
Figure 5:
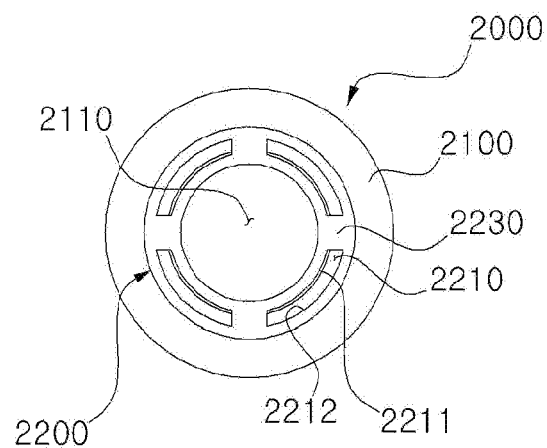
FIG. 5 is a bottom view illustrating a first body according to an example embodiment of the disclosure.
Figure 6:
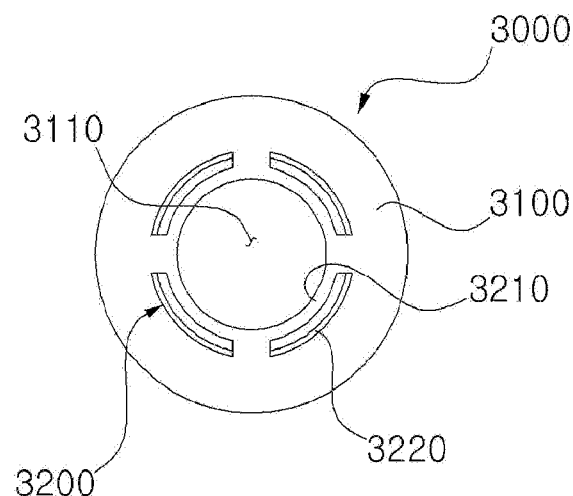
FIG. 6 is a plan view illustrating a second body according to an example embodiment of the disclosure.
Figure 7:
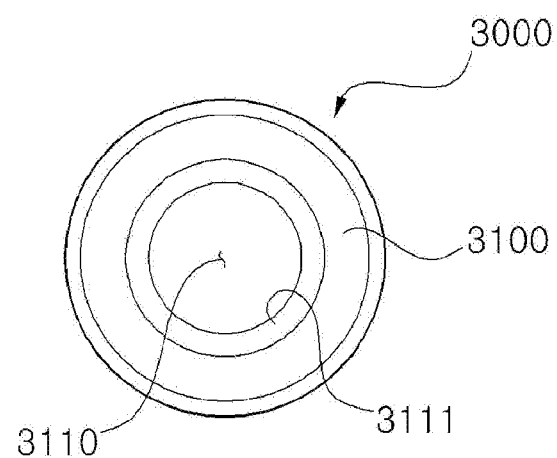
FIG. 7 is a bottom view illustrating a second body according to an example embodiment of the disclosure.

FIGS. 2 and 3 are exploded perspective views illustrating an ornament assembly according to an example embodiment of the disclosure. FIGS. 4 and 5 are plan view and bottom view illustrating a first body according to an example embodiment of the disclosure. FIGS. 6 and 7 are plan view and bottom view illustrating a second body according to an example embodiment of the disclosure.

Referring to FIGS. 2 and 3, an ornament assembly 1000 according to an example embodiment of the disclosure includes a first body 2000 and a second body 3000 which is opposite to the first body 2000. A fabric 1 such as cloth, leather or synthetic resin is disposed between the first body 2000 and the second body 3000.

For example the fabric 1 may be a portion of bag, handbag, banner, tent and the like, and a string may be connected to the portion. A hole 2 is formed through the fabric 1 for connecting the string to the fabric 1.

According to an example embodiment of the disclosure, the first body 2000 is disposed at a side of the fabric (upper side of the figure), and the second body 3000 is disposed at other side of the fabric (lower side of the figure). And then, the first body 2000 and the second body 3000 are combined with each other through the hole 2. At this time, positions of the first body 2000 and the second body 3000 can be changed.

The first body 2000 includes a first base 2100 which defines a first through hole 2110 at a central portion thereof, and a first protrusion 2200 which is formed along a boundary of the first through hole 2110. The first protrusion 2200 is protruded toward lower direction in the figure, and inserted to the hole 2 of the fabric 1.

The second body 3000 includes a second base 3100 which defines a second through hole 3110 at a central portion thereof, a second protrusion 3200 which is formed along a boundary of the second through hole 3110. The second protrusion 3200 is protruded toward upper direction in the figure, and is combined with the first protrusion 2200 of the first body 2000 through the hole 2 of the fabric 1. At this time, the second protrusion 3200 is spaced apart from the second through hole 3110 in an outer direction of a radius. Thus, a single stepped portion 3210 is formed between the second through hole 3110 and the second protrusion 3200 along the boundary of the through hole 3110.

As the first base 2100 and the second base 3100 have circular shape as an example in the figure, it is an example embodiment of the disclosure. Each of the first base 2100 and the second base 3100 may have various shapes such as elliptical or polygonal shapes. Similarly, the hole 2 of the fabric 1, the first through hole 2110 of the first body 2000, and the second through hole 3110 of the second body 3000 may have various shapes such as elliptical or polygonal shapes.

In addition, as shown in FIGS. 2 and 4, a round portion 2111 which is convex toward inner side may be formed on the first base 2100 along the boundary of the first through hole 2110. As shown in FIGS. 3 and 7, a round portion 3111 which is convex toward inner side may be formed on the second base 3100 along the boundary of the second through hole 3110. Accordingly, wear and damage of the string which is connected to the first and second through holes 2110 and 3110 in a traditional ornament assembly due to a friction on edges of the first and second through holes 2110 and 3110, may be prevented in the disclosure.

In addition, an insert groove 2210 is formed on a bottom surface of the first body 2000. The insert groove 2210 is opposite to the second protrusion 3200 of the second body 3000. When the first body 2000 is combined with the second body 3000, the second protrusion 3200 of the second body 3000 is inserted in the insert groove 2210 of the first body 2000. Accordingly, when the first body 2000 is combined with the second body 3000, the second protrusion 3200 of the second body 3000 is received in the first protrusion 2200 of the first body 2000, so that an end portion of the second protrusion 3200 of the second body 3000 may be not exposed to outside through the first through hole 2110. Thus, design and touch feeling of the ornament assembly may be improved. Thus, as shown in FIGS. 4 and 7, the ornament assembly 1000 according to an example embodiment of the disclosure, the end portions of the second protrusion 3200 and the first protrusion 2200 may not be exposed to outside through the first through hole 2110 and the second through hole 3110.

Referring to FIGS. 2 and 6, a locking portion 3220 is protruded from the upper portion of the second protrusion 3200 toward outside. A locking jaw 2221 is formed on an inside surface of an outer sidewall 2212 which surrounds the insert groove 2210. When the first body 2000 is combined with the second body 3000, the locking portion 3220 of an end portion of the second protrusion 3200 is inserted into the insert groove 2210, and then the locking portion 3220 is stuck and supported by the locking jaw 2221, so that the first body 2000 and the second body 3000 may be completely combined with each other.

For example, as shown in FIG. 3, an incision portion 2220 which is connected to the insert groove 2210 may be formed along an outer peripheral surface of the first protrusion 2200 to form the locking jaw 2221 as a lower portion of incision portion 2220. At this time, although the incision portion 2220 is formed at an upper portion of the first protrusion 2200 in the figure, the incision portion 2220 may be formed at a proper position as needed.

Figure 8:
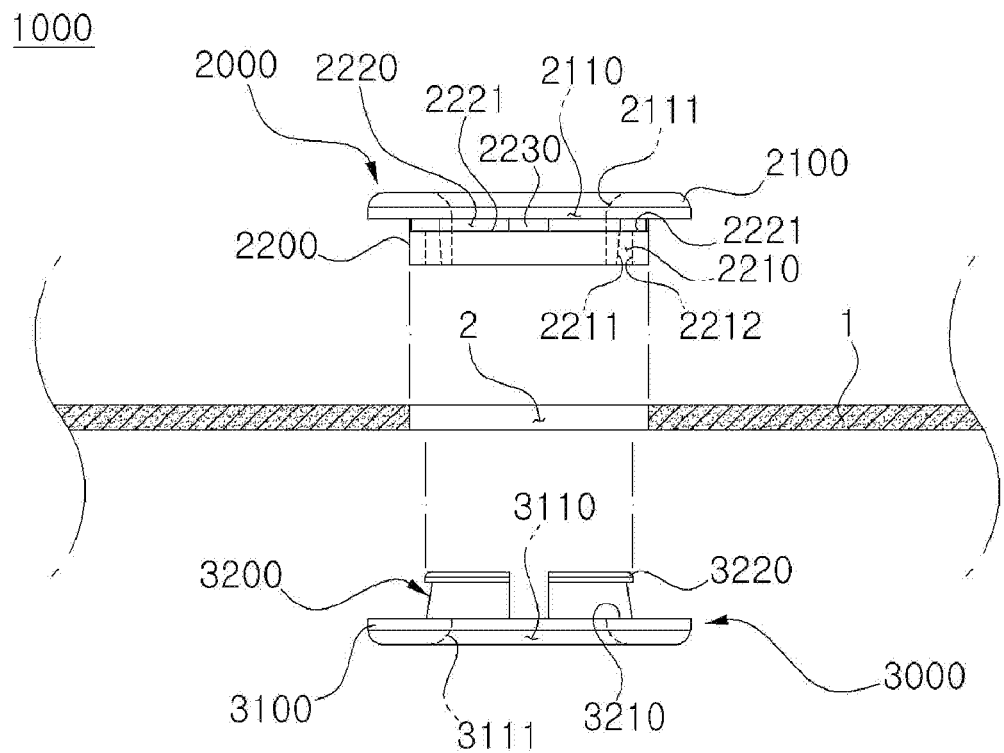
FIG. 8 is a cross-sectional view illustrating an ornament assembly according to an example embodiment of the disclosure.

FIG. 8 is a cross-sectional view illustrating an ornament assembly according to an example embodiment of the disclosure.

Referring to FIG. 8, an ornament assembly 1000 according to an example embodiment of the disclosure includes a first body 2000 and a second body 3000 which is opposite to the first body 2000. A fabric 1 is disposed between the first body 2000 and the second body 3000, and the first body 2000 and the second body 3000 are combined with each other. When the first and the second bodies 2000 and 3000 are combined, the second protrusion 3200 of the second body 3000 is inserted into the insert groove 2210 which is formed on the bottom surface of the first protrusion 2200 of the first body 2000.

At this time, an inner sidewall 2211 of the insert groove 2210 is inclined toward an upper outer direction. Accordingly, the second protrusion 3200 is inserted into the insert groove 2210 along the inner sidewall 2211 with being widen toward outer direction, and the locking portion 3220 at the end portion of the second protrusion 3200 is stuck and supported by the locking jaw 2221. Thus, the inner sidewall 2211 of the insert groove 2210 guides the locking portion 3220 at the end portion of the second protrusion 3200 to the locking jaw 2221 when the first body 2000 and the second body 3000 are combined with each other.

The second protrusion 3200 may preferably be divided into a plurality of parts along the boundary of the second through hole 3110, so that the second protrusion 3200 may easily widen toward the outer direction. The insert groove 2210 may preferably be divided into a plurality of parts corresponding to each part of the second protrusion 3200. Referring to FIGS. 3 and 5, a dividing rib 2230 is formed between the adjacent insert grooves 2210, and between the adjacent incision portions, respectively. In addition, referring to FIGS. 2 and 6, the plurality of the second protrusions 3200 are disposed along the boundary of the second through hole 3110, and are spaced apart from each other by a predetermined gap. An example showing that each of the second protrusion 3200 and the insert groove 2210 has four parts in the figures, the number of divided parts may be properly determined according to deformation property of material and a product specification.

Thus, if the second protrusion 3200 and the insert groove 2210 are divided into plurality of parts, each of the locking portions 3220 is supported by each of the locking jaws 2221 between the adjacent dividing ribs 2230 when the first body 200 and the second body 3000 are combined with each other. At this time, relative rotation of the first body 2000 and the second body 3000 due to the dividing ribs 2230 disposed at both sides of the locking portion 3220 in a circumferential direction. Thus, noise and wear or damage of the fabric 1 or the ornament assembly 1000 due to relative rotation of the first and second bodies 2000 and 3000 may be prevented.

In addition, inclined angle of the inner sidewall 2211 of the insert groove 2210 may preferably be 7 degree to 10 degree with respect to a central axis. If the inclined angle is smaller than 7 degree, combining force may be decreased because the locking portion 3220 at the end portion of the insert groove 2210 cannot be supported by the locking jaw 2221. If the inclined angle is larger than 10 degree, assembly workability of the second protrusion 3200 may be declined, and the second protrusion 3200 may be damaged or deformed during the assembly work. The inclined angle of the inner sidewall 2211 of the insert groove 2210 may more preferably be 8.5 degree with considering the assembly workability, preventing damage or deform of the second protrusion 3200 and the combining force after assembly.

In addition, an inner surface of the second protrusion 3200 may preferably be perpendicularly formed, so that the second protrusion 3200 may be tightly inserted in the insert groove 2210. And an outer surface of the second protrusion 3200 may preferably be inclined toward upper and inner direction to a lower portion of the locking portion 3220. Thus, the outer surface of the second protrusion 3200 may be inclined, so that external diameter of the second protrusion 3200 is gradually decreased as going to an end portion thereof, which is a lower portion of the locking portion 3220.

When the first body 2000 and the second body 3000 are combined with each other, the inner surface of the second protrusion 3200 contacts to the inner sidewall 2211 of the insert groove 2210, and the outer surface of the second protrusion 3200 contacts to the outer sidewall 2212 of the insert groove 2210.

The end portion of the first protrusion 2200 of the first body 2000 may preferably make contact with an upper surface of the second base 3100 of the second body 3000. At this time, a lower portion of the inner sidewall 2211 of the insert groove 2210 contacts to and is supported by a single stepped portion 3210 of an inner side of the second protrusion 3200

Figure 9:
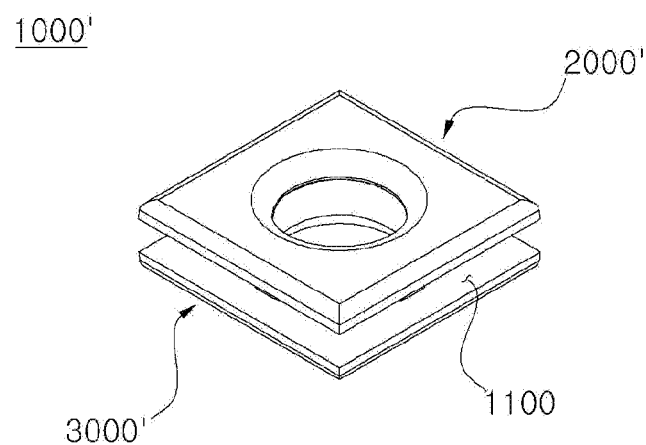
FIG. 9 is a perspective view illustrating an ornament assembly according to another example embodiment of the disclosure.
Figure 10:
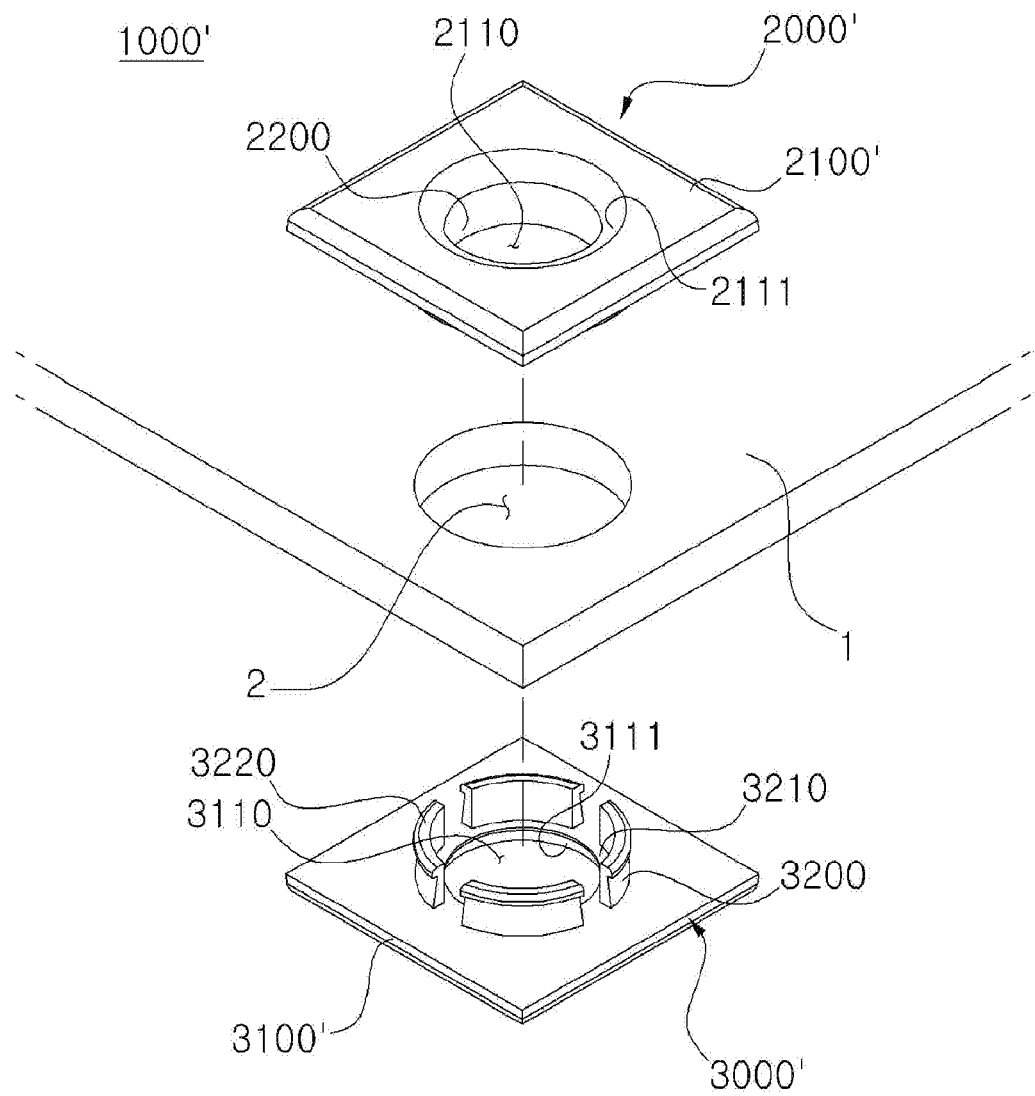
FIGS. 10 and 11 are exploded perspective views illustrating an ornament assembly according to another example embodiment of the disclosure.
Figure 11:
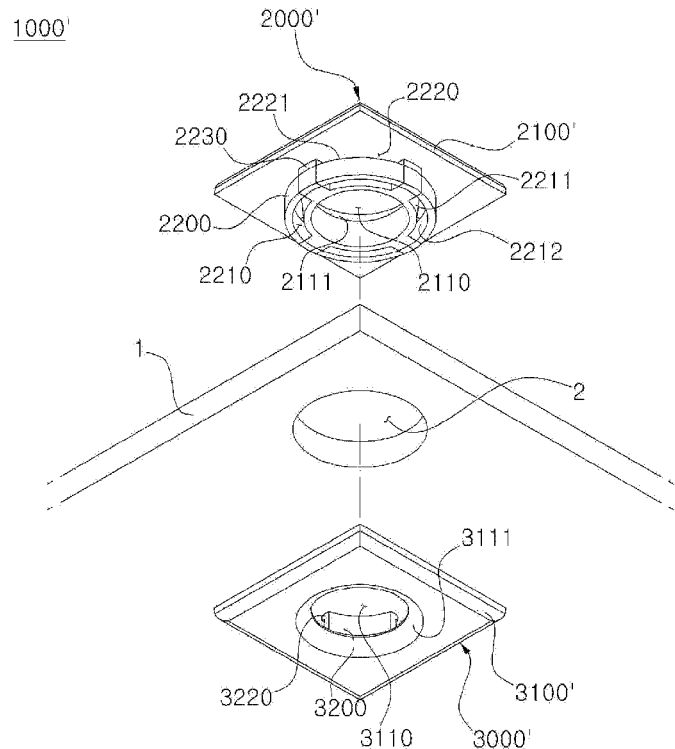
Figure 12:
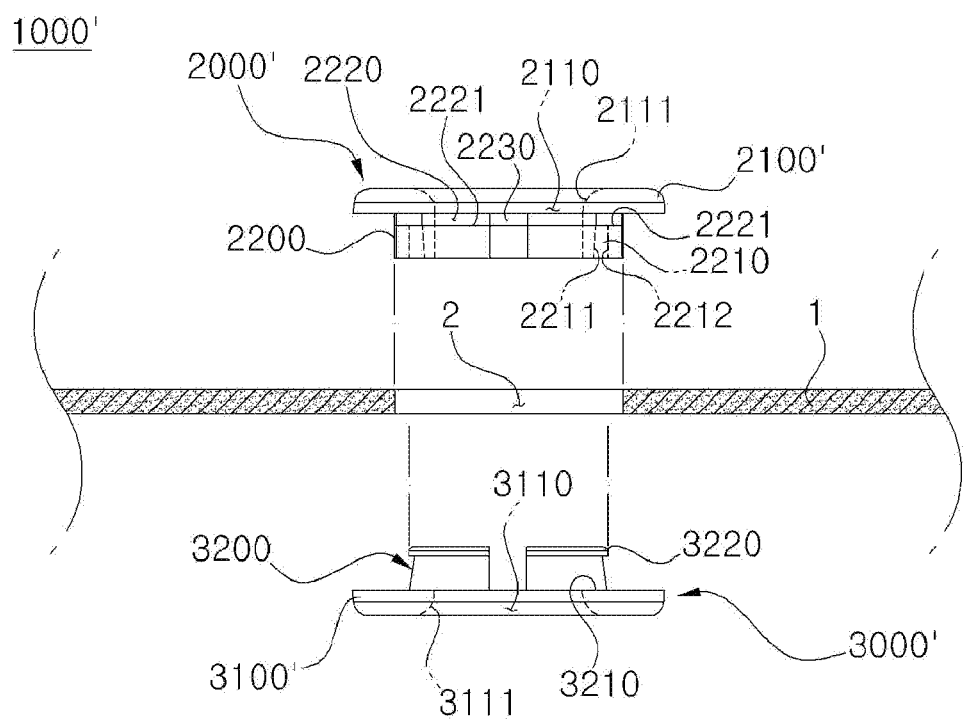
FIG. 12 is a cross-sectional view illustrating an ornament assembly according to another example embodiment of the disclosure.

FIG. 9 is a perspective view illustrating an ornament assembly according to another example embodiment of the disclosure. FIGS. 10 and 11 are exploded perspective views illustrating an ornament assembly according to another example embodiment of the disclosure. FIG. 12 is a cross-sectional view illustrating an ornament assembly according to another example embodiment of the disclosure.

An ornament assembly 1000' according to another example embodiment of the disclosure is substantially same as the above example embodiment, except that a first base 2100' of a first body 2000' and a second base 3100' of the second body 3000' have quadrangle shapes.

Thus, like reference numerals refer to like elements of the above example embodiment having like functions, and any further detailed descriptions concerning the same elements will be omitted.

According to another example embodiment of the disclosure, the first base 2100' and the second base 3100' have quadrangle shapes. At this time, although a first through hole 2110 and a second through hole 3110 have circular shapes in the figure, the first through hole 2110 and the second through hole 3110 may have various shapes such as elliptical or polygonal shapes as mentioned above.

When the first body 2000' and the second body 3000' are combined with each other, a second protrusion 3200 of the second body 3000' is inserted into an insert groove 2210 which is formed at a bottom surface of a first protrusion 2200 of the first body 2000. A locking portion 3220 at an end portion of the second protrusion 3200 is stuck and supported by a locking jaw 2221 at a side of an insert groove 2210. The second protrusion 3200 of the second body 3000' is received in the first protrusion 2200 of the first body 2000, so that the end portion of the second protrusion 3200 may be not exposed to outside through the first through hole 2110. Both sides of the locking portion 3220 are blocked by a dividing rib 2230, so that noise and wear or damage due to relative rotation of the first and second bodies 2000' and 3000' may be prevented.

Figure 13:
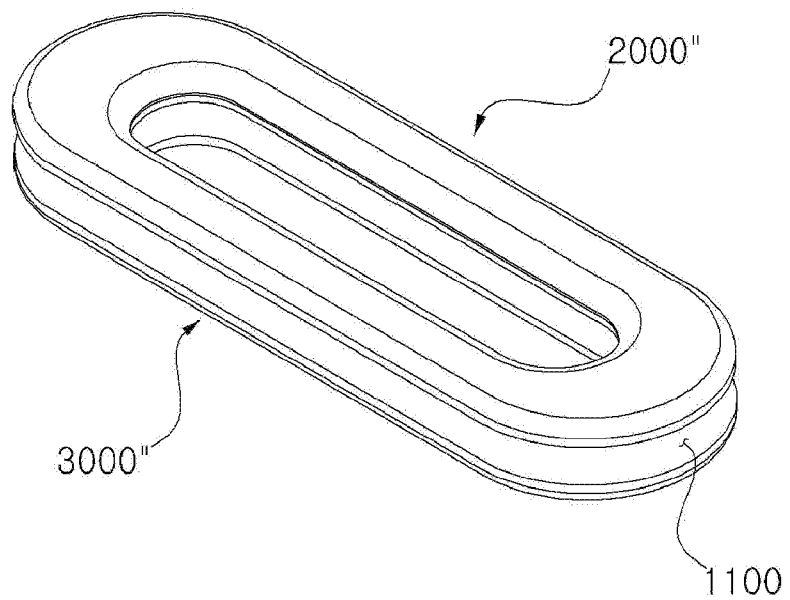
FIG. 13 is a perspective view illustrating an ornament assembly according to still another example embodiment of the disclosure.
Figure 14:
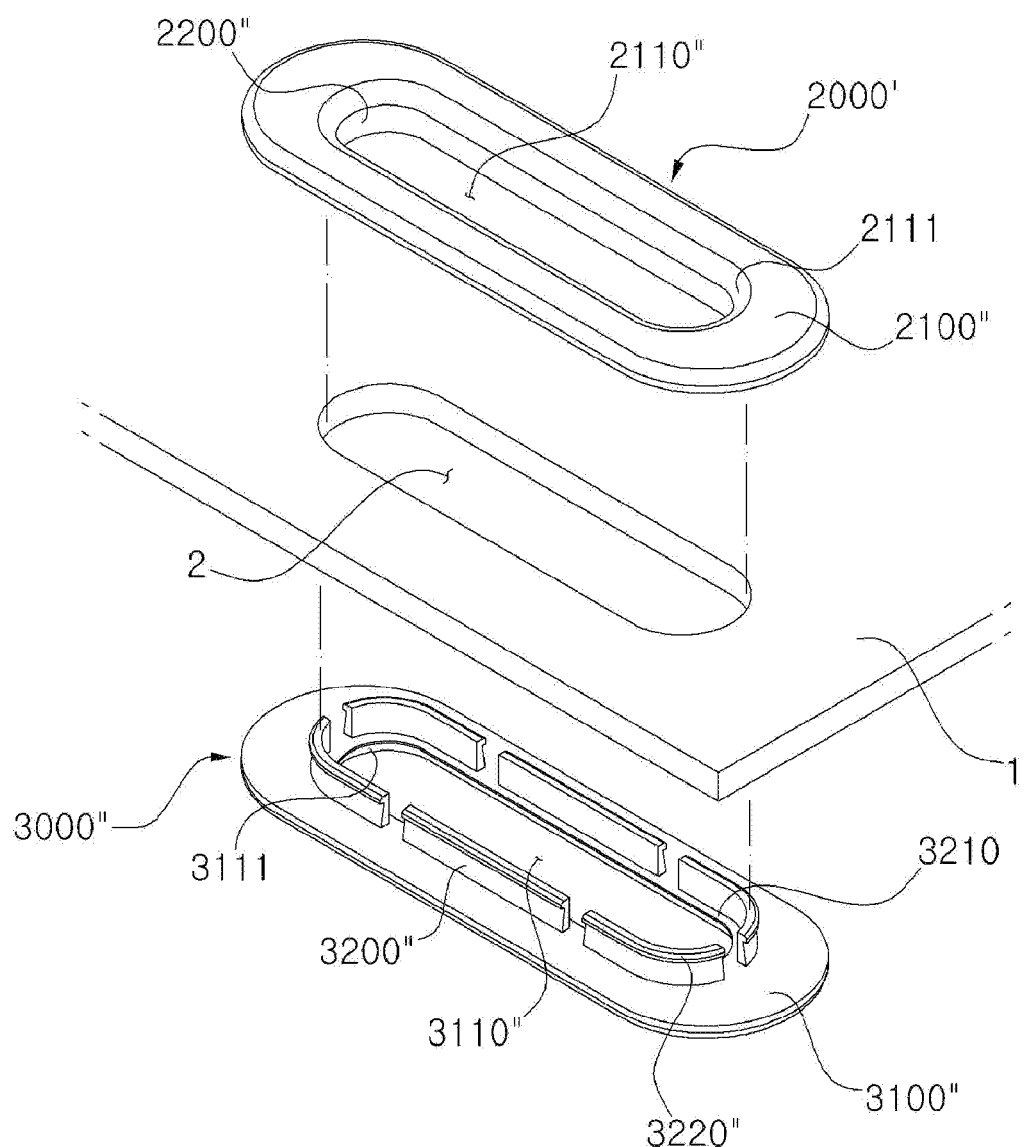
FIGS. 14 and 15 are exploded perspective views illustrating an ornament assembly according to still another example embodiment of the disclosure.
Figure 15:
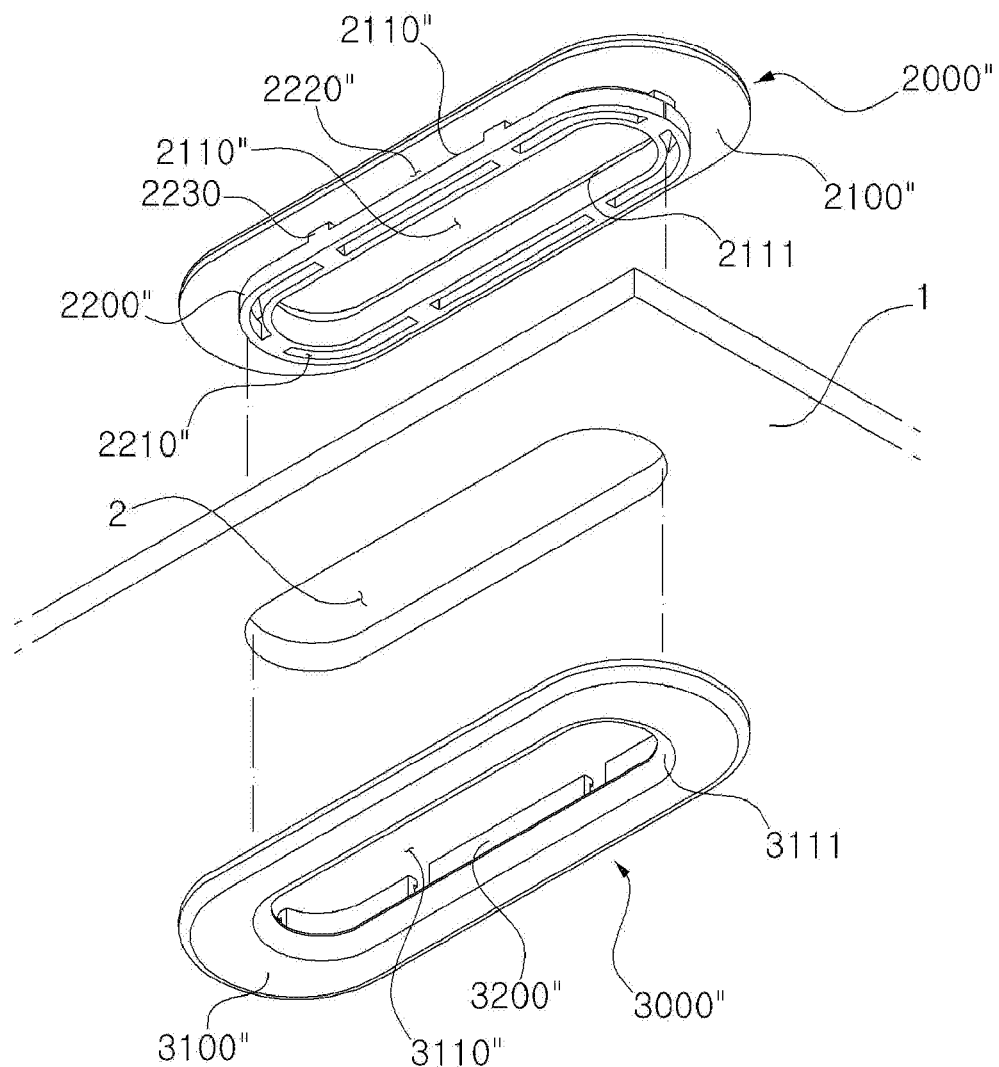
Figure 16:
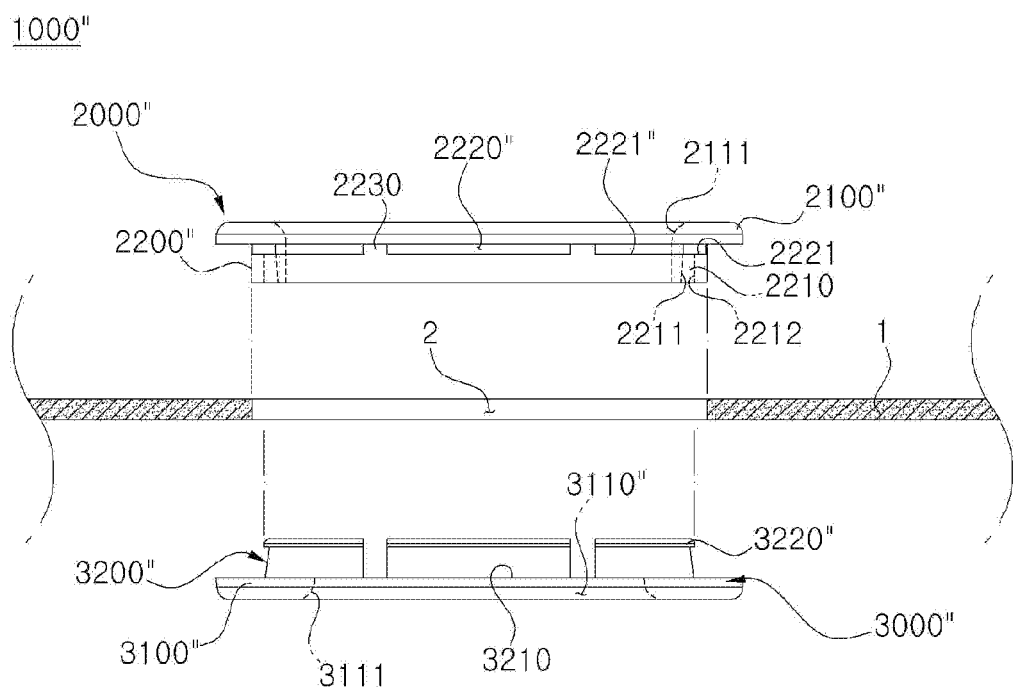
FIG. 16 is a cross-sectional view illustrating an ornament assembly according to still another example embodiment of the disclosure.

FIG. 13 is a perspective view illustrating an ornament assembly according to still another example embodiment of the disclosure. FIGS. 14 and 15 are exploded perspective views illustrating an ornament assembly according to still another example embodiment of the disclosure. FIG. 16 is a cross-sectional view illustrating an ornament assembly according to still another example embodiment of the disclosure.

An ornament assembly 1000' according to another example embodiment of the disclosure is substantially same as the above example embodiment, except that a first base 2100" and a first through hole 2110" of a first body 2000", and a second through hole 3110" and a second base 3100' of the second body 3000' have elliptical shapes. Hereinafter, like reference numerals refer to like elements of the above example embodiment having like functions, and any further detailed descriptions concerning the same elements will be omitted.

According to still another example embodiment of the disclosure, a first protrusion 2200" having an elliptical shape is formed along a boundary of the first through hole 2200", and a second protrusion 3200" which is spaced apart from a boundary of the second through hole 3110" and having an elliptical shape is formed along the second through hole 3110".

An insert groove 2210" and the second protrusion 3200" may preferably be divided into a plurality of parts. The insert groove 2210" may be divided into a plurality parts by at least one or more of dividing rib 2230. The second protrusions 3200" may be spaced apart from each other by a predetermined distance along the boundary of the second through hole 3110". At this time, width or thickness of the dividing rib 2230 may be properly determined according to property of material and a product specification such as thickness and size of the product. The incision portion 2200" is formed along a circumference of an upper and outer surface the first protrusion 2220" to be connected to the insert groove 2210". The dividing rib 2230 divides adjacent incision portion 2220".

When the first body 2000" and the second body 3000" are combined with each other, a second protrusion 3200" of the second body 3000" is inserted into the insert groove 2210" which is formed at a bottom surface of the first protrusion 2200" of the first body 2000". A locking portion 3220" at an end portion of the second protrusion 3200" is stuck and supported by a locking jaw 2221" at a side of the insert groove 2210".

At this time, the second protrusion 3200" of the second body 3000" is received in the first protrusion 2200" of the first body 2000", so that an end portion of the second protrusion 3200" of the second body 3000" may be not exposed to outside through the first through hole 2110". Thus, design and touch feeling of the ornament assembly may be improved.

The foregoing is illustrative of the disclosure and is not to be construed as limiting thereof. Although a few example embodiments of the disclosure have been described, those skilled in the art will readily appreciate that many modifications are possible in the example embodiments within the scope of the disclosure as defined in the claims.

According to the ornament assembly of the disclosure, the end portion of the second protrusion is not shown to users. Thus, a design of the ornament assembly may be improved.

In addition, according to the ornament assembly of the disclosure, problem with separation during the use of the ornament assembly and problem with damage on the fabric may be prevented.

In addition, according to the ornament assembly of the disclosure, workability may be improved, so that manufacturing time and cost may be decreased. Thus, productivity may be improved.

What is claimed is:

1. An ornament assembly comprising:
a first body comprising a first base defining a first through hole at a center of the first base and a first protrusion protruded from a boundary of the first through hole; and
a second body comprising a second base defining a second through hole at a center of the second base and a second protrusion protruded from a boundary of the second through hole,
wherein the first protrusion is protruded toward the second body, and the second protrusion is protruded toward the first body;
the first protrusion has an insert groove at a surface which is opposite to the second protrusion, and the second protrusion is inserted into the insert groove to be combined with the first protrusion;
wherein the first body further comprises an incision portion which is formed at a side of the first protrusion, and the incision portion is connected to the insert groove;
wherein a diameter of an inner sidewall of the insert groove close to the first base is greater than a diameter of the inner sidewall of the insert groove further from the first base; and
the second protrusion is inserted into the insert groove along the inner sidewall, and the second protrusion is guided to the incision portion.

2. The ornament assembly of claim 1, wherein an end of the second protrusion is received within the first protrusion of the first body.

3. The ornament assembly of claim 1, wherein an end of the second protrusion is received within the insert groove and the incision portion.

4. The ornament assembly of claim 1, wherein the incline angle of the inner sidewall of the insert groove is 7 degree to 10 degree with respect to a central axis.

5. The ornament assembly of claim 1, wherein the second protrusion is divided into a plurality of parts along the boundary of the second through hole; and
the insert groove of the first protrusion is divided into plurality of parts.

6. The ornament assembly of claim 5, wherein the first body further comprises a dividing rib formed between the insert grooves disposed adjacent to each other.

7. The ornament assembly of claim 1, wherein an outer side-surface of the second protrusion of the second body is inclined, and an outer diameter of the second protrusion is gradually decreased as going to an end of the second protrusion, and an inner surface of the second protrusion is perpendicularly formed.

8. An ornament assembly comprising:
a first body comprising a first base having a first through hole at a center of the first base and a first protrusion protruded from the first base and formed around the first through hole, the first protrusion having an insert groove formed in a top surface of the first protrusion; and
a second body comprising a second base having a second through hole at a center of the second base and a second protrusion protruded toward the first base from the second base and formed around the second through hole, the second protrusion inserted into the insert groove to be combined with the first protrusion,
wherein the first body further comprises an incision portion which is formed at a side of the first protrusion;
a diameter of an inner sidewall of the insert groove close to the first base is greater than a diameter of the inner sidewall of the insert groove further from the first base; and
the second protrusion is inserted into the insert groove along the inner sidewall, and the second protrusion is guided to the incision portion.

9. The ornament assembly of claim 8, wherein the insert groove comprises a plurality of insert grooves; and
the second protrusion comprises a plurality of second protrusions formed in positions facing the plurality of insert grooves.

10. The ornament assembly of claim 9, wherein the plurality of insert grooves are formed around the first through hole; and
the plurality of second protrusions are formed around the second through hole.

11. The ornament assembly of claim 8,
wherein the second protrusion has a locking portion protruding outwardly from an end of the second protrusion, and the locking portion is inserted into the insert groove.

12. The ornament assembly of claim 8, wherein the insert groove comprises a plurality of insert grooves formed around the first through hole; and
the second protrusion comprises a plurality of second protrusions formed in positions facing the plurality of insert grooves and formed around the second through hole; and
the first body further comprises a dividing rib formed on the first base and formed between the insert grooves disposed adjacent to each other.

* * * * *